March 22, 1960 L. W. BELOUNGIE 2,929,927

AMPLITUDE CONTROLLED PULSE GENERATOR

Filed April 28, 1953

INVENTOR
LAWRENCE W. BELOUNGIE

BY W.R. Maltby
D.C. Snyder
ATTORNEYS 2,929,927

AMPLITUDE CONTROLLED PULSE GENERATOR

Lawrence W. Belounge, Watertown, Mass., assignor, by mesne assignments, to the United States of America as represented by the Secretary of the Navy Application April 28, 1953, Serial No. 351,666

3 Claims. (Cl. 250—27)

Figure 1:
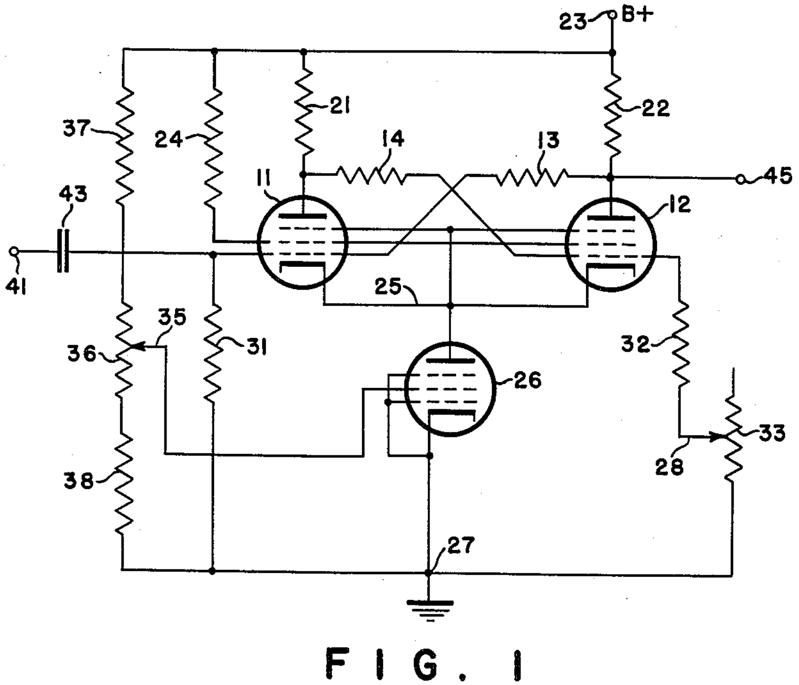

This invention relates to pulse-driven circuits and more particularly to voltage comparator circuits of the kind which may be used in connection with the counting of voltage cycles, for example, sinusoidal voltages.

In many conventional high-speed counting circuits, it is customary to employ a bi-stable multivibrator or flip-flop circuit for the production of a single counting pulse in response to each sinusoid of voltage which may be considered as a trigger pulse or input signal. Circuits of this type generally function satisfactorily in response to an input signal which contains no harmful spurious impulses. However, in certain pulse-driven multivibrator applications, extraneous noise impulses may become superimposed upon the sinusoidal voltage, trigger the multivibrator counting apparatus and produce extraneous pulses which cause error of counting of the input signals.

To obtain accurate counting of given sinusoidal voltages, it is therefore desirable that a system be provided which will produce a single pulse from a multivibrator in response to each sinusoid of voltage even in the presence of superimposed noise impulses. Pulse-driven multivibrator apparatus of the general nature to be described herein as constructed in accordance with the prior art comprises, generally, a bi-stable multivibrator having a pair of electron tubes in which a first tube, upon receipt of an input pulse, becomes conducting and applies a negative potential to the grid of the second tube so as to drive the second tube from the conducting to the non-conducting state. With reference to an input signal of sinusoidal wave form, the first transfer period, when conduction shifts from the second tube to the first tube of the multivibrator, occurs when the sinusoidal input voltage increases to a predetermined amplitude sufficient to initiate multivibrator action. A second transfer period restoring conduction to the second tube occurs when the sinusoidal input voltage falls below the amplitude required to maintain the first tube conducting. The characteristics of the input signal and the multivibrator circuit constants related to the energizing voltages on the tubes, the bias circuits of the respective control grids, and the choice of the time constants determine the initiation of conduction of the first tube and the transfer of conduction back to the second tube. It has been found that a multivibrator circuit of this kind is generally non-selective as to the magnitude or duration of the input signal and will become triggered irregularly by spurious pulses which may accompany the sinusoidal voltage input. It is thus apparent that wide inaccuracies in a counting system of this kind will result unless provision is made in the multivibrator circuit to inhibit counting action due to noise.

The present invention contemplates a bi-stable multivibrator circuit arranged with an adjustable, substantially constant current device connected in a common cathode circuit for the two multivibrator tubes to hold the current through the multivibrator circuit substantially constant independently of the amplitude of the input signal. The multivibrator is given a predetermined cathode bias to establish the input signal amplitude at which the first transfer period occurs. The constant current device is initially adjusted to control the input signal level at which the second transfer period occurs. The constant current device, in holding the current through the multivibrator substantially constant, does so by continuously adjusting the cathode bias of the multivibrator as the input signal varies in amplitude until the cathode bias differs from the predetermined cathode bias by the amount necessary to restore the multivibrator circuit to its initial state.

It is accordingly an object of the invention to provide a circuit that is capable of comparing a sinusoidal input voltage with a selected predetermined voltage to determine that the input has equalled or exceeded the predetermined voltage level and capable of producing a single output pulse each time the predetermined voltage level has been reached.

Another object of the present invention is to provide a pulse-driven circuit which can be used as an extremely stable counting device.

A further object of the present invention is to provide a simple pulse-driven circuit operable in response to a voltage of fixed amplitude and frequency to obtain timing markers for use in precision electronic instruments.

Another object of the present invention is to provide a pulse-driven circuit capable of responding to triangular input voltages to obtain a precision time delay in terms of the periodicity of the triangular voltages.

More specifically, it is an object of the present invention to provide a pulse-driven multivibrator circuit having a controllable voltage separation between transfer periods which inhibits the counting of undesired pulses accompanying the input signal.

Figure 2:
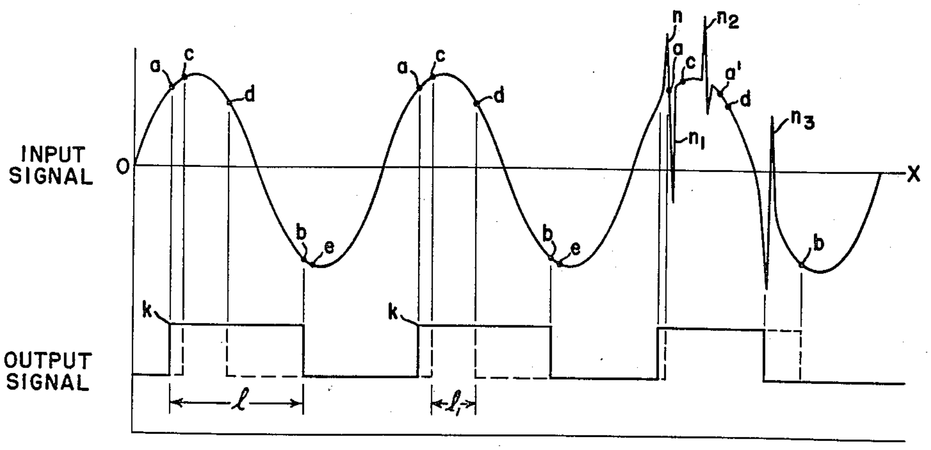

Other objects and many of the attendant advantages of this invention will be readily appreciated as the same becomes better understood by reference to the following detailed description when considered in connection with the accompanying drawings wherein:

Fig. 1 is a circuit diagram of the invention in which a pentode electron tube is employed for holding the current through the multivibrator constant; and Fig. 2 is a graph explanatory of the principle of operation of the circuit.

Referring to Fig. 1 the invention is seen to be comprised of a pair of pentode tubes 11 and 12 connected in a conventional multivibrator circuit in which the control grid of tube 11 is cross-coupled by a resistor 13 to the plate of tube 12 and similarly the control grid of tube 12 is cross-coupled by a resistor 14 to the plate of tube 11. Plate resistors 21 and 22 are coupled to a suitable source of positive potential at terminal 23. The suppressor grid of each tube is connected to its respective cathode, as shown, and the screen grid of each tube is connected through resistor 24 to the potential source at terminal 23.

The control grid of tube 11 is connected to ground by grid resistor 31. The control grid of tube 12 is connected through resistor 32 to the movable arm 28 of a variable resistor such as potentiometer 33 which, together with resistors 21 and 14, forms a voltage divider between the positive terminal 23 and ground. By this adjustable means a bias potential is applied to the grid of tube 12 to place it in an initial state of conduction. Potentiometer 33 also acts to control the voltage level at which tube 12 is cut off and tube 11 conducts in a manner which will be described later.

The present invention is particularly directed to the bias control circuit for the multivibrator tubes and consists of the cathode of each tube being connected in a common circuit by conductor 25 to the plate of the constant current pentode tube 26. The control grid and suppressor grid of tube 26 are both directly connected to the cathode which in turn is connected to ground at terminal 27, thus providing a means for holding the current through the multivibrator circuit independent of the conduction of either tube and of the amplitude of an input signal applied to the grid of tube 11. The screen grid of tube 26 is similarly coupled to movable arm 35 of potentiometer 36 which, in connection with resistors 37 and 38, forms a voltage divider between the positive potential 23 and ground, thus providing a means for controlling the amount of current which flows through the current limiting pentode, which in turn acts to establish the level at which an input signal applied to the tube 11 will cause the multivibrator to transfer back to its initial state of conduction as will presently be explained.

The circuit operates in the following manner. In its initial state, the multivibrator is biased so that tube 11, as shown, is nonconducting and tube 12 is conducting, the grid voltage of tube 12 being adjusted to some positive value by the action of the voltage divider network composed of resistors 21, 14, 32 and potentiometer 33. The cathode potential of tube 11 and similarly that of tube 12 is maintained by constant current pentode tube 26 so that tube 11 cannot conduct unless its grid voltage exceeds the bias level determined by the setting of a movable arm 28 of potentiometer 33. Thus, since the current through cathode load tube 26 is at this time independent of the grid voltage of tube 11, and since the current through either or both tubes 11 and 12 cannot exceed a value determined by the conduction conditions of tube 26, the grid potential at which tube 11 conducts and the first transfer period commences is determined by the preestablished conducting conditions of tube 12 because cathode bias on tube 11 is thereby determined. Assuming that a sinusoidal voltage representing an input signal at terminal 41 is applied to the grid of tube 11 through coupling capacitor 43, when the input signal has risen to a positive level which exceeds the preset bias level of tube 12, conduction of tube 11 occurs, plate current flowing through plate loading resistor 21 reduces the plate voltage on tube 11 and the grid voltage on tube 12, thus reducing conduction of tube 12. This action causes a rise in the plate voltage of tube 12 which, coupled to the grid of tube 11 through resistor 13, causes tube 11 to conduct more heavily in turn driving tube 12 to nonconduction to produce a positive output voltage at terminal 45 and completing the first defined transfer period. Tube 26 maintains the cathode bias potential on conducting tube 11 at the level required to hold the current through tube 11 constant while the sinusoidal driving voltage continues on its positive excursion. No increase of current occurs in tube 11 because of the constant current connection of tube 26 which causes the cathodes to follow up the input signal at tube 11. As the input signal decreases from its peak value, the potential at the grid of tube 11 is reduced and tube 11 tends to be biased toward cutoff. However, tube 26 adjusts the cathode potential downwardly to maintain the multivibrator current constant, thus delaying a second transfer period for an adjustable amount as much as one quarter wave. When the voltage across tube 26 is thus reduced to a sufficiently low value, the grid bias voltage on tube 12 causes tube 12 to conduct, multivibrator action again takes place, the second transfer period occurs and tube 11 is driven to nonconduction, thereby re-establishing the initial condition of the multivibrator.

It is apparent from the foregoing that either the magnitude of the potential difference in the input signal at the two transfer periods or the amount of time required to return the multivibrator to an initial state, at which tube 12 is conducting and the output voltage at terminal 45 is at its initial value, may be controlled by varying the operating potentials of tube 26. A suitable means of controlling this delayed operation is to vary the screen grid potential of tube 26, as shown, by movable arm 35 of potentiometer 36. To increase the separation between transfer periods, the screen potential is increased. It will be seen that this screen potential may be adjusted to delay the time tube 12 conducts until the input signal has fallen to some low value which prohibits any accompanying noise from retriggering the multivibrator until a second positive cycle approaches the preset value of the grid voltage on tube 12. These effects are illustrated in Fig. 2 in which is shown the sinusoidal input voltage varying about a given input level represented by the line OX, and the corresponding output signal at terminal 45. When the input signal reaches a value "*a*," which is set by the bias on the multivibrator, tube 11 conducts to produce a positive output voltage which rises to point "*k*," as shown by the output signal solid line in Fig. 2, and continues at that level as long as tube 11 conducts. Point "*b*" on the input signal curve represents the value of the input signal at which tube 11 is cut off and at which the output signal returns to its initial value. The level at which the input signal, including negative values up to full input amplitude, acts to cut off tube 11 to make it susceptible to further triggering may be varied from a value such as point "*d*" to a value at point "*e*" by controlling the bias on tube 26, depending upon the signal-to-noise ratio. Consequently, the conductivity of tube 11 may be prolonged until the input signal has become so low in value, including the negative of the signal amplitude, that any aforementioned noise voltage accompanying the signal is incapable of retriggering the multivibrator. For example, a noise pulse "*n*" superimposed on the input signal is shown driving tube 11 to conduction before the input signal reaches the preset value "*a*," followed shortly thereafter by a negative peak $n_1$ of large amplitude, which would drive a conventional multivibrator circuit to its initial conducting state thus to complete a counting cycle followed by a further count due to the existing input signal positive level, and thereby to produce an extraneous count. However, the multivibrator of Fig. 1 is adjusted to be driven to nonconduction only in response to a negative input signal of the value shown at points "*b*," which is far lower than the value, say at point "*d*," where the conventional multivibrator would be driven to complete a counting cycle. Thus, negative noise pulse $n_1$, or subsequent noise pulse $n_2$ has no effect on the output counting pulse, which, however, may occur a little previous in time due to the triggering action of the original noise pulse *n*. Similarly, a noise pulse such as $n_3$ acting to drive tube 11 to nonconduction before the input signal has a value of "*b*," cannot drive tube 11 to conduction again to produce an extraneous pulse, provided its positive peak does not exceed point "*a*." The broken line associated with the third output pulse indicates the output pulse obtained in the absence of noise. As noted previously, the multivibrator may be given a predetermined bias voltage by adjustment of potentiometer 33 to establish the level of the input signal amplitude between points "*a*" and "*c*" at which the first transfer period occurs. Thus, when desirable, an output pulse of the width "$l_1$" shown by the dotted lines may be produced by adjustment of potentiometers 33 and 36. In this manner the circuit may be adjusted to adapt it for a variety of input voltage wave forms having different characteristics as to amplitude and width and, in some instances for triangular input voltages, to obtain a precision time delay in terms of the periodicity of such voltages. It is apparent that output pulses of opposite polarity may be obtained by coupling the output circuit to the plate of tube 11.

It is to be understood that the multivibrator circuit shown represents only one embodiment of the invention which may include the use of a similar circuit having capacitor-coupled plate and grid elements and any two tubes having similar operating characteristics together with any constant current tube capable of operating in the above described manner. From the foregoing description, it is apparent that the invention provides a pulse-driven multivibrator circuit selective in its response to an input signal of pre-established width and amplitude through the use of a current limiting or constant current device for the cathode load of the circuit in order to obtain sufficient separation between transfer periods.

Obviously many modifications and variations of the present invention are possible in the light of the above teachings. It is therefore to be understood that within the scope of the appended claims the invention may be practiced otherwise than as specifically described.

What is claimed is:

1. A pulse generator for producing a rectangular output pulse when the amplitude of a sinusoidal input signal exceeds a predetermined level comprising a source of sinusoidal input signals, a bistable multivibrator having a normally "on" tube and a normally "off" tube and having the plates and control grids of these tubes cross-coupled, means for coupling said signals to the control grid of said normally "off" tube, a pentode, said pentode having its plate coupled to the cathodes of said tubes, its cathode and a first control grid connected only to a reference potential and a second control grid connected to a constant voltage source which is positive with respect to said reference potential, means for biasing said normally "on" tube to a degree of conduction such that the potential on the plate of said pentode permits said pentode to operate as a constant current device, said biasing means determining the point on the positive half cycle of said sinusoidal input signal at which said multivibrator is triggered and the magnitude of said constant voltage source determining the point on the negative half cycle of said sinusoidal input voltage at which said multivibrator is restored to its standby condition.

2. A comparator circuit for generating a rectangular output voltage whose leading and trailing edges are determined by the times at which the amplitude of a sinusoidal signal exceeds a first positive and a second negative level respectively comprising a source of sinusoidal input signals, a bistable multivibrator, said multivibrator having as components thereof a normally "on" and a normally "off" electron tube the plates and control grids of which are cross-coupled, means for connecting said source of sinusoidal input signals to the control grid of said normally "off" tube, a pentode, said pentode having its plate coupled to the cathodes of said tubes, its cathode and a third control grid connected only to a reference potential, and a second control grid connected to a constant voltage source which is positive with respect to said reference potential, a resistor connected between the control grid of said normally "off" tube and said reference potential, means for biasing said normally "on" tube to a degree of conduction such that the potential on the plate of said pentode equals said positive level, said biasing means and the magnitude of said constant voltage source thereby determining the amplitude of the positive and negative input signals which must be present at the control grid of said normally "off" tube to trigger and reset, respectively, said bistable multivibrator and an output circuit coupled to the plate of said normally "on" tube.

3. A comparator for producing a rectangular output pulse whose time of duration corresponds to the time required for a sinusoidal input signal to pass from a first predetermined positive level to a second predetermined negative level comprising, in combination, a source of sinusoidal input signals, first and second multi-electrode vacuum tubes, each of said vacuum tubes having a load resistor connected between its plate and a source of operating potential, a first resistor connected between the plate of said first tube and the control grid of said second tube, a second resistor connected between the plate of said second tube and the control grid of said first tube, a pentode, said pentode having its plate coupled to the cathodes of said first and second tubes, its cathode and a first control grid connected only to a reference potential and a second control grid connected to a constant voltage source which is positive with respect to said reference potential, means for biasing said second tube to a more positive potential level than said first tube, whereby said second tube comprises the normally "on" tube and said first tube, the normally "off" tube of a bistable multivibrator, means for setting the bias level of said second tube to a value such that the voltage at the plate of said pentode is sufficient to have said pentode operate as a constant current device, said bias level determining the amplitude of the positive sinusoidal signal necessary at the control grid of the first tube to trigger said multivibrator and the magnitude of said constant voltage source determining the amplitude of the negative sinusoidal signal necessary at the control grid of said first tube to reset said multivibrator, and an output circuit coupled to the anode of said second tube.

References Cited in the file of this patent

UNITED STATES PATENTS

| | | |
|---|---|---|
| 2,562,530 | Dickinson | July 31, 1951 |
| 2,572,016 | Elbourn | Oct. 23, 1951 |
| 2,588,924 | Hecht | Mar. 11, 1952 |

FOREIGN PATENTS

| | | |
|---|---|---|
| 584,740 | Great Britain | Jan. 22, 1947 |